(No Model.) 4 Sheets—Sheet 1.
L. GUTMANN.
ALTERNATING CURRENT MOTOR.
No. 577,427. Patented Feb. 23, 1897.
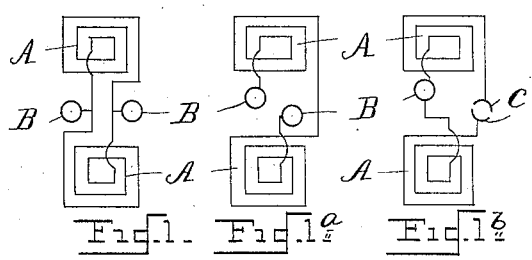
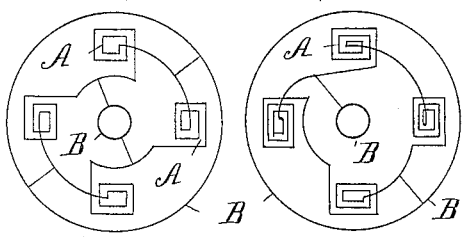
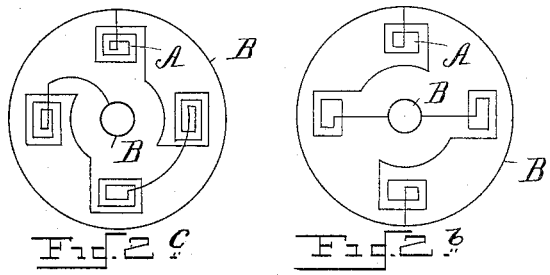
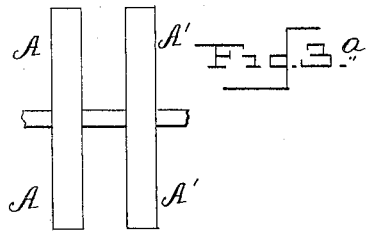
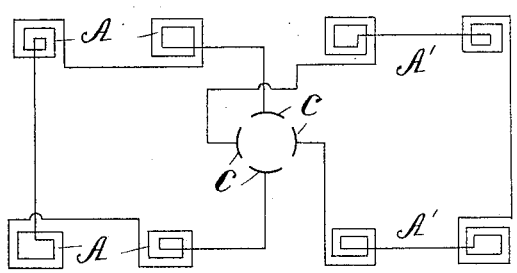
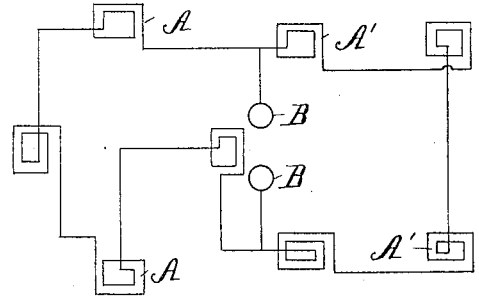
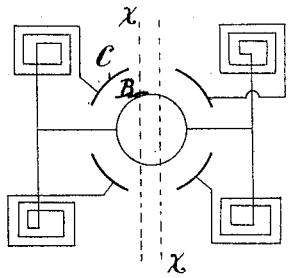
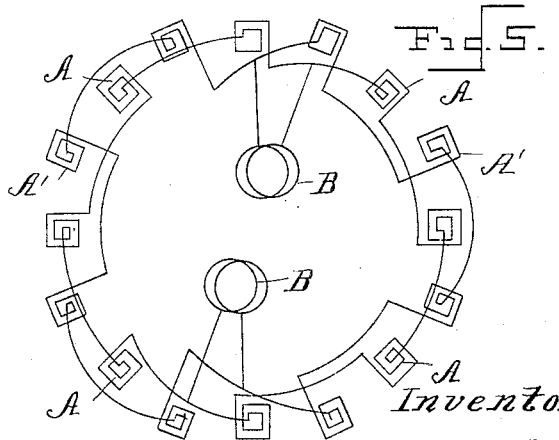
Witnesses
W. H. Courtland
Nellie L. Pope
Inventor
LUDWIG GUTMANN
BY HIS ATTORNEY
Edward P. Thompson

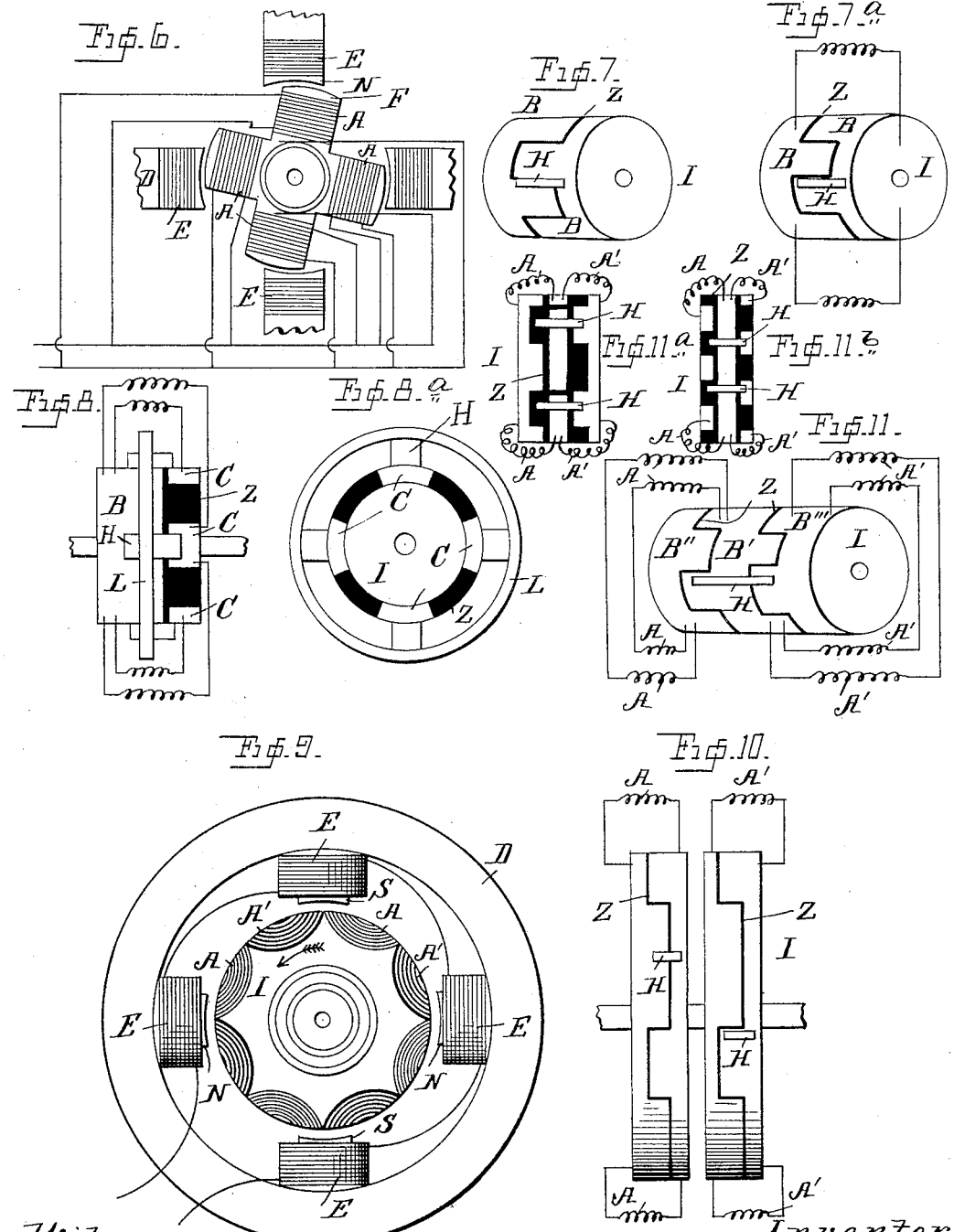

(No Model.) 4 Sheets—Sheet 3.
L. GUTMANN.
ALTERNATING CURRENT MOTOR.
No. 577,427. Patented Feb. 23, 1897.
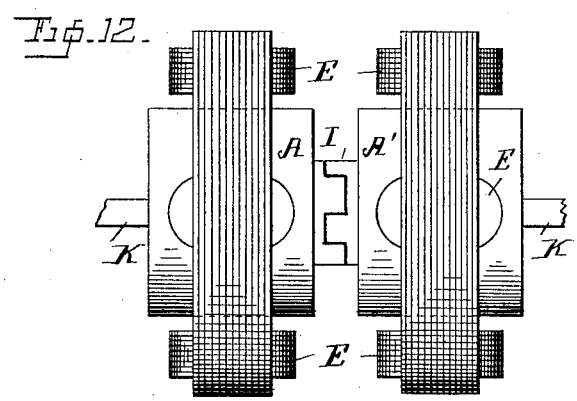
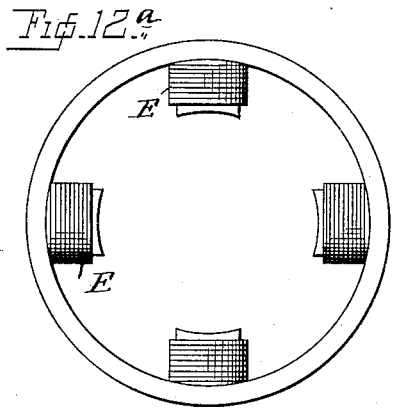
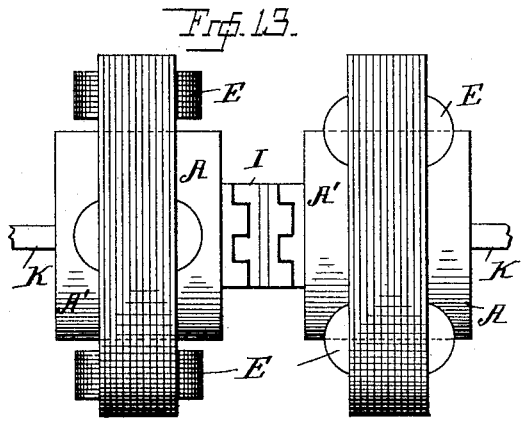
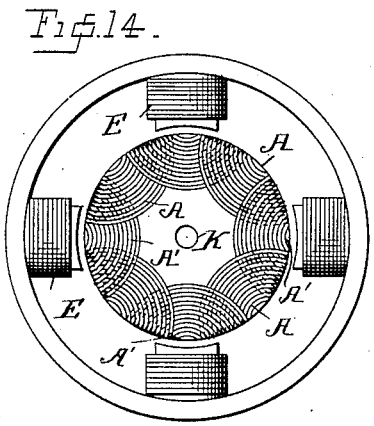
Witnesses:
W. H. Courtland
Nellie L. Pope
Inventor
LUDWIG GUTMANN
BY HIS ATTORNEY
Edward P. Thompson

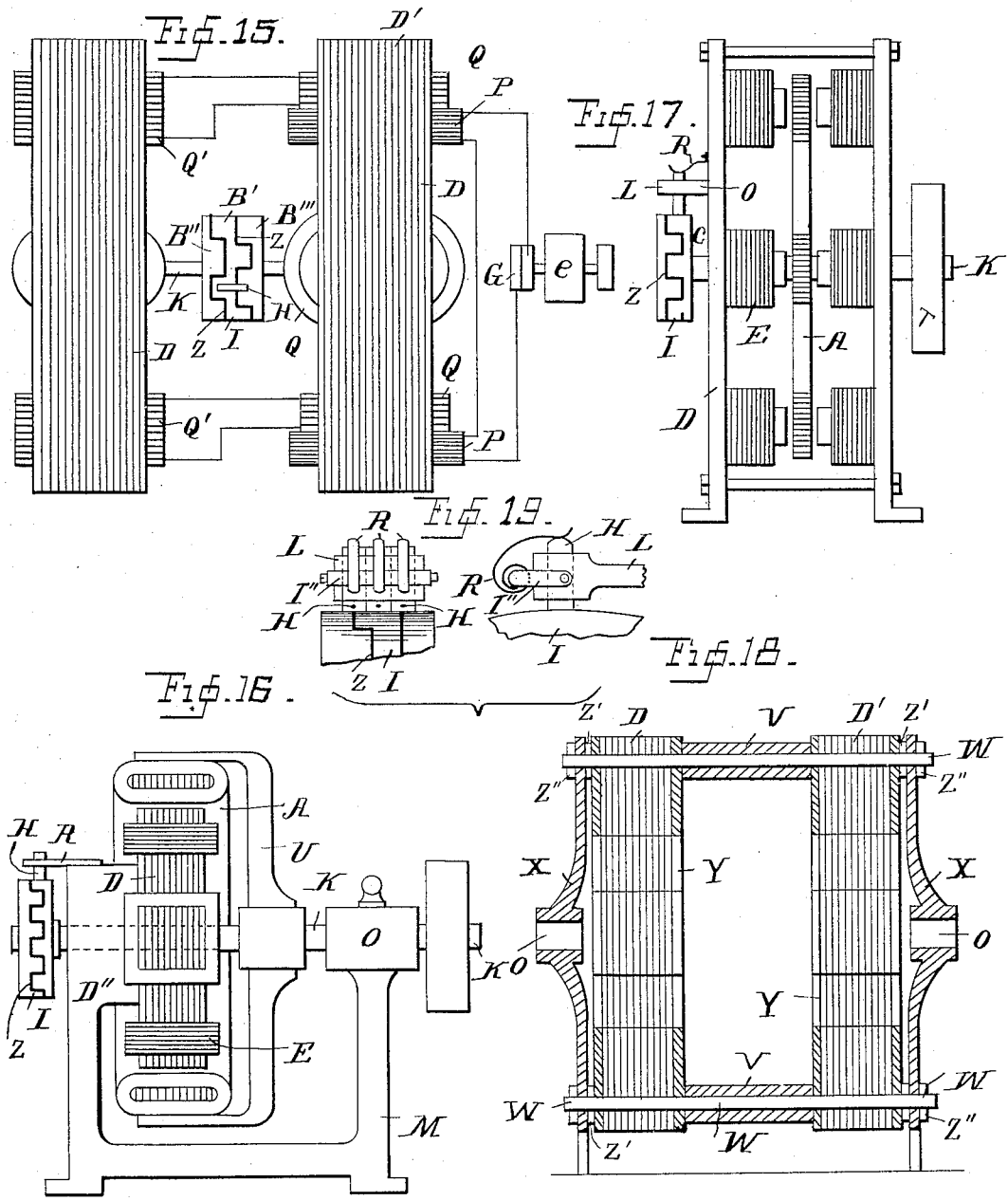

UNITED STATES PATENT OFFICE.

LUDWIG GUTMANN, OF PITTSBURG, PENNSYLVANIA.

ALTERNATING-CURRENT MOTOR.

SPECIFICATION forming part of Letters Patent No. 577,427, dated February 23, 1897.

Application filed February 4, 1891. Serial No. 380,120. (No model.)

*To all whom it may concern:*

Be it known that I, LUDWIG GUTMANN, a subject of the German Emperor, and a resident of Pittsburg, county of Allegheny, and State of Pennsylvania, have invented certain new and useful Improvements in Alternating-Electric-Current Motors, (Case No. 51,) of which the following is a specification.

This invention relates to the class of electric motors designed for operating by alternating, pulsating, or intermittent electric currents.

The exact nature of the invention is set forth, together with its modifications, in connection with the accompanying drawings.

Figures 1, $1^a$, $1^b$, 2, $2^a$, $2^b$, $2^c$, 3, $3^a$, $3^b$, 4, and 5 are diagrams of armature-windings and connections. Fig. 6 is a view of an armature surrounded by its field-magnet. Figs. 7 and $7^a$ show details of a commutator. Figs. 8, $8^a$, 10, 11, $11^a$, and $11^b$ are modifications of Fig. 7. Fig. 9 is a multipolar motor with special armature construction. The terminals of its field-winding are shown extended over the frame to indicate its connection with a suitable generator, shown in connection with one of the latter figures. Figs. 12, $12^a$, and 13 are modifications over Fig. 9. Fig. 14 is a side view of Fig. 13. Fig. 15 is a modification of Figs. 12 and 13, being similarly energized, but in addition may be provided with a secondary field-magnet system. Figs. 16 and 17 show complete motors. Fig. 18 shows detail construction of the field-magnet of Figs. 12 or 13, and Fig. 19 gives two views of a suitable brush-holder.

Referring to Fig. 1, it represents in a conventional way an armature to be used in connection with my invention. The winding is divided into two coils A, which are permanently closed through one another. Their ends are connected to circular contact-terminals B, whose special construction is explained in connection with Figs. 7 and 11.

Fig. $1^a$ shows in diagram another armature similar to Fig. 1, except that the subdivided winding is of the open type, the coils A being in series and one end of either coil connected to a terminal B. Fig. $1^b$ is another open-coil winding. The difference between Figs. $1^b$ and $1^a$ lies in the construction of the collecting device, which is described in connection with Figs. 8, $11^a$, and $11^b$.

Fig. 2 shows an armature whose winding is divided into four coils, forming a closed winding, the joints of which are connected to the terminals B, one of which is represented by the circle inclosing the coils, the other by that located centrally. Fig. $2^a$ shows another armature whose winding is subdivided into four coils, which, owing to their connection to the terminals B, are grouped two in series and two in parallel. In Fig. $2^b$ the winding is also subdivided into four coils, all of which are in series. Two of them are connected to one terminal B, and similar ends of the other two coils are attached to the second terminal B, so that the coils are grouped in pairs and each two are connected in series across the two terminals B. In Fig. $2^c$ the four coils are also in series with one another, but only two ends of two coils are connected to contact-terminals B. The two last-named armature-windings belong to the open type. The difference between them is the change caused by the application of one or more brushes, which would make the winding of Fig. $2^b$ equivalent to a multiple-series connection, while that of Fig. $2^c$ remains a simple series.

Fig. 3 shows an armature whose windings are located in two parallel planes. (See Fig. $3^a$.) Each half-winding of Fig. 3 consists of four coils in series and is of the open-coil type and connected to contacts $c\,c$. In a similar manner are arranged the coils of the second half. Fig. $3^b$ is similar to Fig. $3^a$, the only difference being that the one half-winding is displaced with respect to the other half and the two half-windings form one closed winding, the one half being closed upon themselves by the coils of the second half. Both halves are connected to the circular terminals B B.

The armature represented in Fig. 4 consists also of four coils, four ends of which are connected to sectors $c$, while the others are connected to the common terminal B. This armature, as will be noticed, is of the open-coil type, but it may be made also to be of the "separate-winding" type by splitting the ring B, as indicated by the two dotted lines $x$ $x$, into two sectors. In this case the armature would be of a subdivided two-coil separate-winding type, but this type is not further mentioned, as its operation does not vary from that of the open-coil type, nor does it simplify the construction.

Fig. 5 represents another closed winding consisting of two sets of eight subcoils A A', which are all in series. The coils may be so connected that all are in series relation in such a way that a brush will not change their relation, as in Fig. $1^b$, or so that parallel groups will be formed when both terminals B are touched, as in Fig. 5. The armature consists of two such windings, but is also operative with one, and therefore one set of eight subcoils may be omitted without changing the nature of the invention. This diagram gives one of the various ways in which the coils in Figs. 6, 9, 14, 15, 16, and 17 may be connected. The combination of armature-coil connections, as these few examples show, can be varied in many ways, and, further, any of these armatures may be placed into any suitable multipolar field or in one arranged so as to develop several non-intersecting magnetic fields—viz., such fields lying in parallel planes to one another, as shown hereinafter in connection with different motor constructions.

The motor type shown in Fig. 6 consists of a four-pole field-magnet D, which develops north and south poles in order around the armature. The field-electromagnet, whose coils are not shown connected to one another or to a source, may be grouped in any desired way—for instance, as in Fig. 9. Its energy is derived from a suitable generator. (Shown in connection with Fig. 15.) The armature has four poles F, around which the single armature-winding is wound, subdivided into four coils. The ends of these coils may be connected to the commutator I in any suitable manner, as shown in diagram Figs. 1 to 5. It is mounted on the armature-shaft K and appears in end view. The details of the construction of this commutator I are shown in Fig. 7. This special design of commutator may be regarded as a switch with preferably circular terminals, and is designed to group the armature coils or subdivisions according to their position in a magnetic field to cause the strongest possible torque and at the same time prevent sparking as much as possible at the terminals on changing the circuit connections of the armature-coils. This commutator consists of two circular terminals B, each provided with projections extending toward one another, but electrically separated by insulation Z, indicated by heavy black lines, and a contact H, adapted to periodically connect these two circular terminals B to one another.

For a four-pole motor each ring-terminal B has four projections, the width of which, as well as that of the intervening recesses, depends on the size of the field-pole, the distance between neighboring poles, and the width of an armature-coil. The contact H is located laterally on the periphery of the terminals, so as to rest either on one terminal B alone or else at periods also on a projection of the second terminal B. The whole is mounted on shaft K. The armature-coils are shown conventionally and connected to the commutator in Fig. $7^a$, while in Fig. 7 they have been omitted.

Fig. $7^a$ represents Fig. 7 in a different position. The contact or brush H is supposed to be stationary. The action will be understood by referring to Figs. 6, 7, and $7^a$.

The moment that the field-magnet D, Fig. 6, is energized by an alternating current the armature A will be repelled when the commutator is in the position shown in Fig. 7, because all the armature-coils are short-circuited upon themselves and are the seat of induced currents, which establish fields and poles opposed to the field-magnets, causing repulsion and rotation.

As the armature A is repelled from maximum position and the commutator I, being mounted on the same shaft K, is turning with it the short circuit is removed (see Fig. $7^a$) when the armature's coils arrive at the weakest position. If now momentum should continue the rotation for an angle of forty-five or fifty degrees, the coils would have a similar position, as at start, and at the same time the two terminals B of commutator I would again be connected, causing repetition of the first-described process and continual rotation in one direction.

The action and effect of the commutator on various types of armatures is therefore, first, to short-circuit simultaneously the armature-coils when all coils are in series; second, to establish two or more short-circuited groups simultaneously when the coils are in a multiple series, and, third, to cause an individual short circuit of every coil simultaneously when the subwindings or coils are arranged in multiple arc with one another at a time when every one of them is in a powerful field and then reëstablish the ordinary close-circuit connection when the coils are without current, or nearly so, due to their position in the field when cutting minimum or no lines of force.

Figs. 8 and $8^a$ show a modified commutator required for an open-coil armature-winding, as represented in Figs. $1^b$ and 4. It consists of a circular terminal B and arc-shaped contact-blocks C, separated from one another and from terminals B by insulation Z. The number of contacts C corresponds to that of the armature-coils, and the circular width of each contact is determined in the same manner as the projections in Fig. 7. To make this device operative, a number of brushes H are provided, one for each block C, and so located as to be permanently in contact with ring B, but in the path of contact-blocks C. All brushes may be supported by the same holder or stand L. (Shown in both figures.)

In Fig. 8 the armature-coils are shown in diagram. In Fig. 8ª they are omitted. Fig. 9 is a modification of the motor. The four-pole field-magnet D is energized by coils E to produce opposite poles in adjacent field-poles, as indicated.

The armature is of the Pacinotti type, having the winding located in the grooves of the armature-core, and is divided into two sets of four coils, which for distinction are marked A and A', of which the coils A are furthermore shown shaded. The two sets are wound so as to face alternately the field-magnet poles. All the coils may either be connected electrically with one another or may be separated in two sets, depending on their connections to the commutator or collecting device. Both ways are shown in Figs. 10 and 11, while in the end view shown in Fig. 9 it is only indicated by rings 1.

In Fig. 10 the modified collector consists of two independent devices, such as are described in Fig. 7, the coils A being connected to one and the coils A' to the second. To effect the short-circuiting of each group at the proper time, the two brushes are displaced for the same angle as the two sets of coils.

Fig. 11 shows a modification of Figs. 7 and 10 and is the commercial device complete. It consists of three circular terminals B' B'' B''' and one contact block or brush H. The eight armature-coils are shown in electric connection with one another in diagram. The coils A and the coils A' have the central terminal B' in common, while their respective remaining ends are each connected to one of the outer terminals B'' B'''. The coils of this armature-winding A, being shown in diagram, may be grouped in any convenient manner. The contact block or brush H is permanently in contact with the central terminal B' and periodically with the two others, B'' B'''. The operation of the commercial motor will be clear after considering that the brush H is alternately touching the projections of the ring-terminals B'' B''', whose teeth are displaced circumferentially for the same angle as the two halves of the armature-winding.

Considering Fig. 11, together with Fig. 9, and assuming the position of armature-coils A' and brush H as shown, it will be evident that when energizing the field-coils E to produce an alternating, pulsating, or intermittent magnetic field the short-circuited coils A' will be repelled and rotate, as indicated by the arrow, while the coils A do not assist in the action. After a rotation of forty-five degrees the coils A come into the position which was occupied by coils A', but commutator I has also rotated for the same angle and is engaging with the brush H to short-circuit the coils A by connecting terminals B' with B'', causing thereby continuation of rotation in the same direction, which movement causes the disengagement of brush H with terminal B''', thereby releasing the coils A' from the short circuit. This action is repeated in an eight-coil armature eight times in one revolution—i.e., at an angle of $\frac{360}{8}=45°$. The four coils forming one-half of the armature-winding in a strong magnetic field are simultaneously short-circuited, while the others, which are mounted intersecting in the same way as their contact-terminals, are either moved without or with but little current through a weak field, and the circuit connections are alternately reversed as the positions of the two half-windings are reversed in the magnetic field.

Fig. 11ª is a modification of Fig. 11. The central conductor is shown interrupted, while the armature-coils A A', shown in diagram, form a permanently-closed winding, as in Fig. 11. Its operation and effect is similar to that of Fig. 11. This commutating device requires four contacts or brushes. In this diagram some armature-coils have been omitted for sake of clearness.

Fig. 11ᵇ shows a commutator for an open-coil armature-winding, also requiring four brushes. By applying this commutator the two half-windings are alternately short-circuited and open-circuited.

In Fig. 12 the field-magnet structure is divided into two parts D and D', as is also the armature core and winding, the latter being influenced each by a separate part of the field-magnet halves whose poles are in line with one another, while the commutator I, shown conventionally and intended to represent any of the forms described, is located centrally between the armature half-windings A and A'. Fig. 12ª is a side view of a field-magnet half, the armature part being omitted.

Fig. 13 is a modification of Fig. 12, the divided field-magnet core D D' being arranged so that the poles of one half are placed midway between the poles of the other half. Further, each of the armature-core parts is provided with a complete winding A A' and connected to the commutator I, located in the center of the machine. The armature-winding which is not shown in Fig. 13 is clearly exhibited in Fig. 14, which is an end view of Fig. 13. Also in this figure the commutating device is shown conventionally and may be of any suitable design. Here, for instance, four circular terminals are shown, while in other figures but three or two are exhibited. It is self-evident that to operate this motor with any given number of brushes different from those shown any suitable number of circular contact-terminals may be used without departing from the nature of the device described.

In Fig. 15 the construction is the same as in Figs. 12 and 13, except as to the field-magnet windings. On one core D' are two sets of coils, the primary, P, and the secondary, Q. The latter is in electric connection with coils Q' on the other core-half D. The primary coils P, which are equivalent to the energizing-coils E of the motor above described, are connected to the collector G of a suitable generator.

Fig. 16 represents a complete motor, the field-magnets D being mounted stationary on the frame D″ and inclosed by the rotary armature A, which is mounted on shaft K, as likewise the commutator I and the pulley T for transmitting mechanical motion. It is evident that in this type either the armature or the field-magnet can be made stationary, depending which of the two parts is mounted on the shaft, as shown in my Patent No. 419,661, dated January 21, 1890.

Fig. 17 is a motor in form of a disk machine. The armature A is mounted on the shaft K and has the field-magnets E located on either side, while the extremities of the shaft are occupied on one side by the commutator I and the other by the pulley T.

Fig. 18 is a field-magnet structure shown in section by a cut through the center. It consists of two parts D D′, of laminated rings, with internal pole projections of magnetic material, such as iron, steel, or both, each half being held together by heavy end plates Y. The two parts are kept parallel to one another by distance-tubes V, mounted on screw-bolts W and firmly held together by nuts Z′. On the same screw-bolts are mounted the combined motor-stand and armature-support X, with the bearings at O. The whole structure is solidly held together by a second set of nuts Z″, which fix the support X to the field-magnet core.

Fig. 19 shows the preferred brush-holder and brushes in two views. The brush H is divided into three parts and rests on collector I, of which a part is shown. Three springs R, mounted on a support I″, are elastically pressing the brush H on the collector. It is desirable to subdivide the block-brush H to allow a quicker feeding of the outside parts, which, owing to their being within the path of the projections, are worn away quicker than the center portions, which continually rest on a smooth surface.

What I claim as my invention is—

1. An alternating-current motor consisting of the combination of a field-magnet core, one or more windings for the same, an armature-core, a winding or windings for said armature-core, contact-terminals connected to said winding or windings, and a block or brush permanently in contact with one armature-terminal and temporarily with the other or others.

2. An alternating-electric-current motor consisting of the combination of a field-magnet, an armature whose winding or windings are subdivided into coils, contact-terminals for said subdivided winding or windings and a brush adapted to rest permanently on one armature-terminal and temporarily and periodically on the other or others.

3. An alternating or pulsating current electric motor consisting of the combination of two field-magnet structures, energizing-coils for said magnet, an armature-core, windings mounted on said core and exposed to the influence of both field-magnet structures, contact-terminals connected to the armature-windings and means such as a brush or brushes for periodically and alternately short-circuiting the armature-windings under influence of the two field-magnet structures.

4. In an alternating or pulsating current electric motor, the combination of field-magnets in one or more subdivisions or structures, an armature-core, two or more windings for said armature-core structure angularly displaced the one from the other, and means for periodically and successively changing the circuit connections of said windings in respect to one another and inclosing them in turn alternately in a closed circuit.

5. In an electric-power-distribution system the combination with a suitable generator, of a motor, having a field-magnet system in one or more core structures, one or more field-windings for each of said core structures, one of which is in circuit with said generator, an armature provided with one or more windings, two or more contact-terminals electrically connected to one member of said motor, and one or more brushes resting permanently on one of said terminals and periodically and alternately on the others.

6. In a commutator or current-collector the combination of two, three or more contact-terminals provided with projections, and each contact insulated from the other and a brush adapted to be permanently in contact with one of said terminals and periodically with one or more of the others.

7. An alternating-current electric motor consisting of the combination of a multipolar-field magnet divided into two or more parallel parts, an armature whose laminated core is also divided axially into two or more core parts, one or more subdivided windings mounted on each of said armature-core parts, contact-terminals connected to said winding or windings and a circuit closer or closers or its equivalent permanently in contact with one of said terminals and periodically with others.

8. In an alternating-current electric motor the combination with field-magnets, of an armature having two or more windings so displaced relatively to the field-poles that one of said windings faces the poles or pole regions while the others are intersecting said regions, a set of contact-terminals connected to said windings common to both sets of coils, and a brush or brushes constantly engaging with some of said terminals and periodically with others.

9. In an alternating-current electric motor the combination with a field-magnet system, of an armature provided with two or more windings subdivided into coils, a commutating or contact device some terminals of which are connected and common to two of said windings, and a brush or brushes in contact with said terminals adapted to engage first with coils of one winding and then with those of the other.

10. In an alternating-current motor the combination of a field-magnet, an armature having two or more windings, electric contact-terminals of positive and negative polarity arranged alternately around a common center connected to said two or more windings and means such as a brush adapted to normally close-circuit an armature-winding to form closed subcircuits.

11. In an alternating-current electric motor the combination of a field-magnet in one or more structures or subdivisions, windings for said subdivisions, an armature whose winding is divided into the same number of divisions as the field, electric contacts or terminals connected in common to said armature-windings and means such as brushes for normally close-circuiting an armature-winding influenced by a field-subdivision, to form one or more closed circuits.

In testimony that I claim the foregoing as my invention I have signed my name, in presence of two witnesses, this 22d of January, 1891.

LUDWIG GUTMANN.

Witnesses:
ALBERT J. WALKER,
CHAS. P. LANG.